Nov. 6, 1928.
H. A. WALTER ET AL
1,690,514
MANUFACTURE OF RUBBER TIRE TREADS
Filed April 1, 1927
2 Sheets-Sheet 1
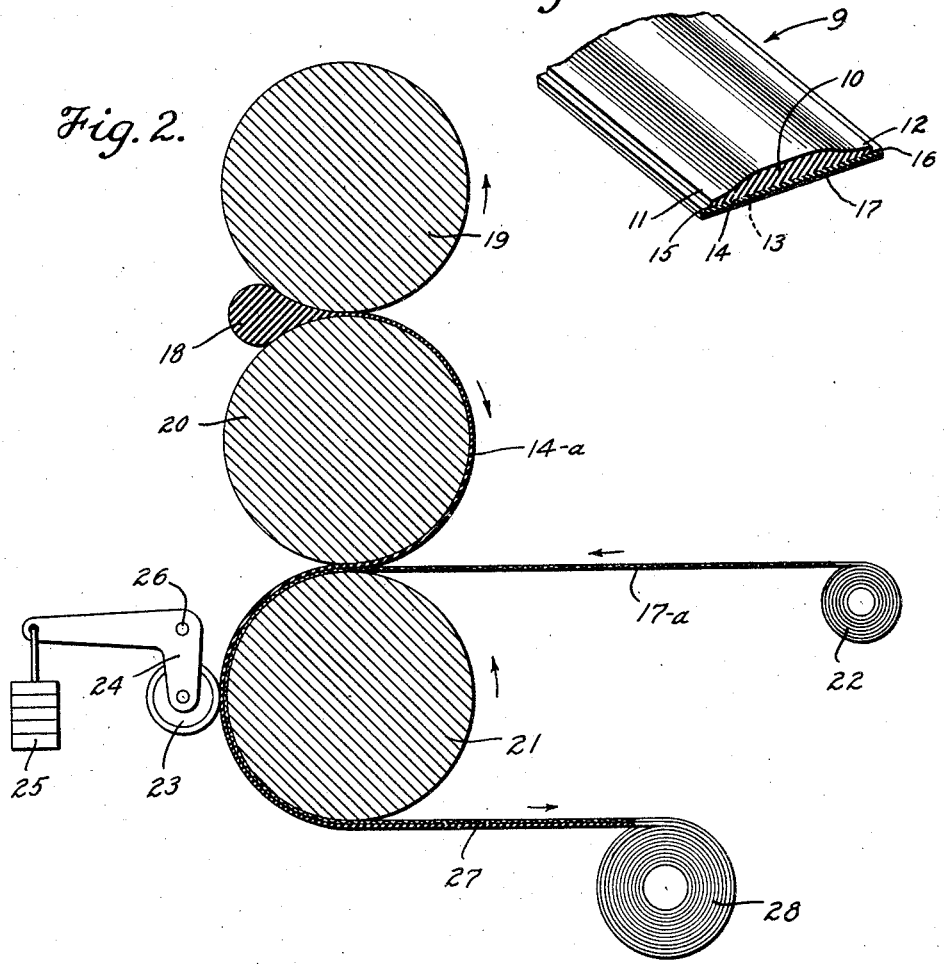
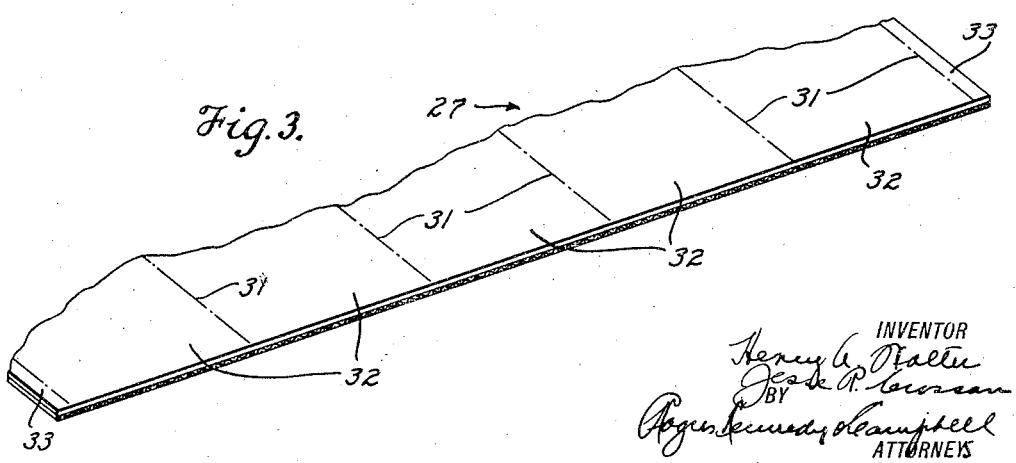

Nov. 6, 1928.  1,690,514

H. A. WALTER ET AL

MANUFACTURE OF RUBBER TIRE TREADS

Filed April 1, 1927  2 Sheets-Sheet 2

INVENTOR
Henry A. Walter
Jesse P. Crosser
BY
Rogers, Kennedy & Campbell
ATTORNEYS Patented Nov. 6, 1928.

1,690,514

UNITED STATES PATENT OFFICE.

HENRY A. WALTER, OF BARBERTON, AND JESSE R. CROSSAN, OF WADSWORTH, OHIO, ASSIGNORS TO SEIBERLING RUBBER COMPANY, A CORPORATION OF DELAWARE.

MANUFACTURE OF RUBBER TIRE TREADS.

Application filed April 1, 1927. Serial No. 180,109.

This invention relates to improvements in methods for producing rubber tire treads, and to improved products resulting from the use of said methods, and is particularly directed to what are known in the tire art as repair treads.

For repairing and retreading used tires, repair shops are supplied with unvulcanized tread stock which has been extruded to the desired cross-sectional configuration and wound up as a stock roll. Prior to being wound in a roll, however, the rubber is provided with a thin covering strip of holland or the like on its flat under side (which is the side that makes contact with the tire), whereby to keep that surface clean, and to prevent air checking, "blooming", and the like. It has been extremely difficult to obtain a uniform and reliable union between the rubber and the holland, due to the fact that they are brought together while the rubber is hot, and thereafter, in cooling, the rubber shrinks, causing the holland to become wrinkled. In order to obtain the best union possible with this prior art method, it has been necessary to use holland strips of considerably greater width than that of the tread stock, resulting in a waste of material; and, moreover, the projecting edges of the holland strip frequency become loosened in the subsequent handling of the stock, permitting the drying out or soiling of the originally protected surface. These and other objectionable features result in considerable wastage annually, and it is the object of this invention to eliminate such wastage and at the same time to improve the product.

This general object is attained by first applying a thin layer of rubber to one surface of the holland and forming a reliable union between them, preferably by running the holland and the rubber together through a set of calendar rolls. A feature of the invention is the provision of the holland in sufficient width to form a plurality of tread base strips (for example, 40 inches in width), and running this full width through the calendar as the thin sheet rubber is formed, and winding the resultant composite sheet in a roll. This roll is then taken to a suitable slitting machine, where it is cut into strips of desired width for individual tread bases, and these strips are subsequently fed longitudinally with reference to the discharge die of an extruding machine, where the tread body is extruded in desired cross-sectional configuration and laid upon the uncovered surface of the sheet rubber. The extruded tread stock is sufficiently hot at the time it contacts with the sheet rubber base to become automatically united or joined thereto and, as the tread stock shrinks in cooling, the thin sheet rubber base will give sufficiently to prevent wrinkling of the holland.

Another desirable feature of the invention resides in the fact that the extruded tread stock can be compounded to give maximum wearing qualities without regard to its adhesive properties, and the thin sheet rubber forming the base of the tread can be compounded to render it more adhesive and therefore more easily applied to a tire carcass. By uniting the thin sheet rubber and the holland in the full width as explained, and subsequently slitting the same, the base of the individual tread and the holland covering it are of exactly the same width, and the only waste in material is a narrow strip at each edge of the full-width composite roll.

These and other features and advantages will be more readily apparent from the following description when read in connection with the accompanying drawings, wherein the invention has been shown by way of illustration, and wherein Fig. 1 is a fragmentary perspective view of an improved repair tread embodying the invention;

Fig. 2 is a vertical transverse sectional view through a conventional set of calendar rolls, showing diagrammatically how the composite base strip is formed;

Fig. 3 is a fragmentary perspective view of the composite multiple base material;

Figure 4:
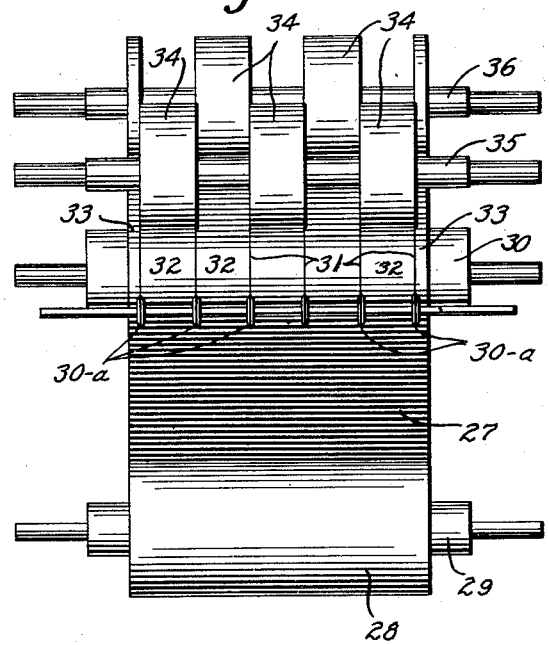
Fig. 4 is a diagrammatic view in front elevation, showing how the composite multiple base material is cut into strips for individual treads.

As best shown in Fig. 1, the improved tread 9 comprises a body 10 of rubber which is compounded for high wearing qualities, and extruded in substantially flat condition, having its greatest thickness at its center and tapering off to relatively thin side edges 11 and 12. The under side 13 of said tread body 10 has permanently secured to it a thin base strip 14 of rubber which, if desired, may be compounded particularly with a view to increasing its adhesive properties to a greater extent than is practical with tread stock. Said thin base strip 14 is preferably calendered stock of slightly greater width than the tread body 10, and has its opposite side edges 15 and 16 extending laterally beyond the side edges 11 and 12 of the tread body, and although they are originally formed as two separate and distinct parts, these rubber portions are united into a homogeneous whole, as will hereinafter be explained. In order to protect the lower surface of the rubber base strip 14 against air checking, blooming, etc., and to keep said surface clean for an indefinite period, it is covered with a thin sheet of protective material 17 of fabric such as holland, or parchment, or its equivalent, as desired. The protective material 17 is of exactly the same width as the base strip 14 and has a firm and uniform surface attachment thereto, but is capable of being manually removed when a length of the tread stock is desired for use. This improved composite stock with its protective holland covering is preferably furnished to the trade in rolls from which any desired length may be cut as and when it is needed.

In producing the improved tread stock 9, a novel method is employed, the principal steps of which are shown diagrammatically in Figs. 2 to 7, inclusive. A bank 18 of gum rubber (Fig. 2) is fed in the usual manner to the pass between a pair of rotating calendar rolls 19 and 20, producing a thin sheet of rubber 14-a of sufficient width to provide a plurality of the tread base strips 14. The rubber sheet 14-a then follows the roll 20 around to a second pass between said roll 20 and a third roll 21, and as it goes through this second pass it comes in contact with one surface of a sheet of holland 17-a which is fed from a stock roll 22. Due to the pressure between the rolls 20 and 21, the sheet 14-a of rubber and the sheet 17-a of holland become firmly united, additional pressure being applied by a pressure roller 23 which is supported at one end of a lever 24, said lever having at its other end suitable weights 25 to swing the lever about its fixed fulcrum 26. Thus a blank 27 of composite sheet material is produced and wound in a stock roll 28.

Figure 5:
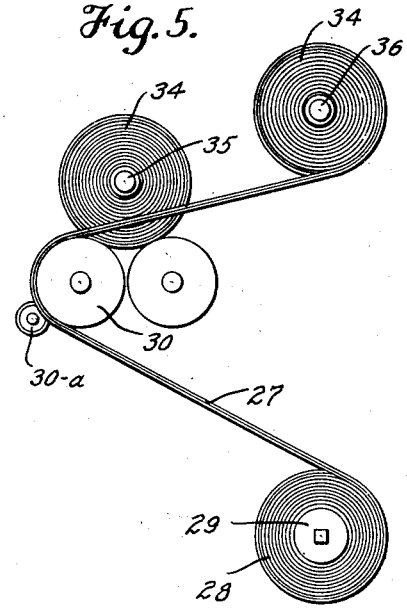
Fig. 5 is an edge view of the apparatus shown in Fig. 4.

Referring to Figs. 3 to 5, inclusive, it will be seen that the roll 28 is next placed on an arbor 29 of a suitable slitting machine, where the sheet blank 27 is run over a roller 30 against which a plurality of rotary cutting knives 30-a are operable to slit the sheet blank 27 on lines 31, defining the individual tread base strips 32. In order to insure uniformly clean-cut edges for the outer strips 32, a relatively narrow ribbon 33 of the composite blank is cut away at the opposite side edges of the sheet blank 27, said ribbons constituting the only waste or scrap in the practice of the invention. After being thus slit, the strips 32 are wound in rolls 34 on arbors 35 and 36, the alternate strips being wound on arbor 35, and the others on arbor 36 (Fig. 4) in order to more evenly wind the several strips.

Figure 6:
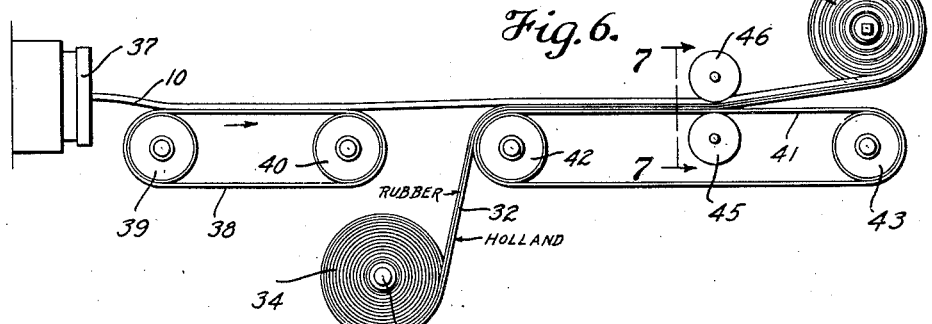
Fig. 6 is an edge view showing diagrammatically how the extruded tread body is presented and applied to the composite base strips.
Figure 7:
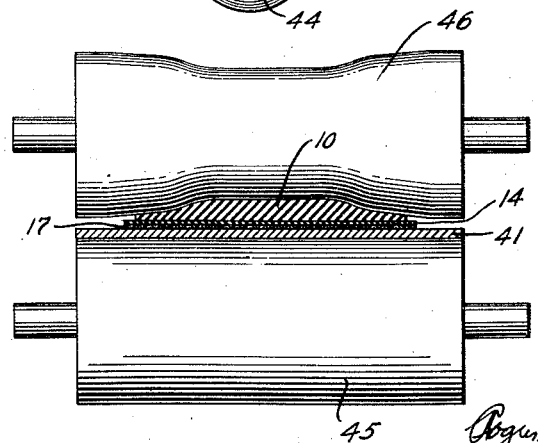
Fig. 7 is a vertical transverse sectional view on the line 7—7 of Fig. 6.

As shown in Fig. 6, the discharge die 37 of an extruding machine is arranged adjacent to an endless conveyor belt 38 which runs over pulleys 39 and 40, the upper side of said belt moving longitudinally in a direction away from the die 37 and at substantially the same speed at which the tread body 10 is extruded from the die. A second conveyor belt 41, running over pulleys 42 and 43, is in longitudinal alignment with the conveyor 38 and synchronized therewith, and disposed below the pulley 40 is an arbor 44 on which one of the composite strip rolls 34 is mounted for rotation. After leaving the die 37, the tread body 10 is carried forward by the conveyor belt 38 and thence over the gap between the conveyor pulleys 40 and 42 to a position on top of the rubber 14 of the strip 32, the end of which has been brought up from the roll 34 to the conveyor belt 41. Said tread body 10 and base strip 32 are then carried together by the belt 41, and because of the heat in the extruded tread stock, these two rubber portions become automatically united or joined together into a single strip. Below the upper run of the conveyor belt 41, and between the pulleys 42 and 43, is a cylindrical roller 45 constituting a support for the belt in opposition to a pressure roller 46, and the union of the tread body to the tread base is completed by their passage between said rollers 45 and 46, after which the completed repair tread is wound into a stock roll 47, ready to be packed and distributed to the trade. The pressure roller 46 may have its periphery grooved to correspond with the cross-sectional configuration of the tread, as shown in Fig. 7, or it may be cylindrical in form and of yieldable material if desired. By definitely relating the plane of rotation of the roll 34 on the arbor 44, with reference to the extruding die 37 and the conveyor belts 38 and 41, the parts of the tread will be accurately brought together in the desired longitudinal relationship, with the edge portions 15 and 16 of the thin sheet rubber base 14 extending equally from the respective side edges 11 and 12 of the tread body.

From the foregoing it will be evident that an improved repair tread and novel method for producing the same have been provided by this invention, the tread having its lower or inner surface better protected than in prior art treads, and the method making possible the rapid and economical production of the improved treads. Obviously the invention is susceptible of modification in the details of construction, and in the steps of the method, and the right is herein reserved to make such changes as fall within the scope of the appended claims without departing from the spirit of the invention.

Having thus described our invention, what we claim is:

1. A method for producing rubber tire treads, which consists in providing a length of lining material, applying a thin layer of rubber to one surface thereof, forming a length of narrower but thicker tread body of rubber, and securing said tread body to the thin layer of rubber on the length of lining material.

2. A method for producing rubber tire treads, which consists in providing a length of lining material, providing a relatively thin layer of calendered rubber of the same width as that of the lining material, uniting said rubber and lining material under pressure, forming a narrower but thicker tread body of rubber, and uniting said tread body to the thin layer of calendered rubber.

3. A method for producing rubber tire treads, which consists in forming relatively thin sheet rubber in a calendar, running a sheet of lining material through the calendar with said sheet rubber whereby to form a union between their adjacent surfaces, extruding rubber to form a length of tread stock with the desired cross-sectional configuration, and uniting said extruded tread stock to the uncovered surface of the thin sheet rubber.

4. A method for producing rubber tire treads, which consists in forming a relatively thin sheet of rubber in a calendar, running a sheet of holland through the calendar with said sheet rubber, whereby to cover one side of the sheet rubber with the holland, extruding rubber tread stock in the desired cross-sectional configuration, running the extruded tread stock onto the uncovered side of the previously formed sheet rubber, and rolling said bodies of rubber with pressure to unite them.

5. A method for producing rubber tire treads, which consists in forming a relatively thin sheet of rubber in a calendar, the sheet being equal in width to a plurality of treads laid side by side, running through the calender with said rubber sheet a covering of holland of corresponding width, whereby to effect a firm surface union between the rubber and the holland, longitudinally slitting the united sheets into a plurality of tread base strips, and permanently securing to the uncovered rubber surfaces of said base strips, strips of rubber tread stock in substantially flat condition.

6. A method for producing rubber tire treads, which consists in forming relatively thin sheet rubber in a calendar, running a sheet of lining material through the calendar with said sheet rubber whereby to form a union between their adjacent surfaces, forming a tread body of rubber with the desired cross sectional configuration, and uniting said tread body to the uncovered surface of the thin calendered sheet.

7. A method for producing rubber tire treads, which consists in forming a relatively thin sheet of rubber in a calendar, the sheet being equal in width to a plurality of treads laid side by side, running through the calender with said rubber sheet a covering of holland of corresponding width, whereby to effect a firm surface union between the rubber and the holland, longitudinally slitting the united sheets into a plurality of tread base strips, forming a series of tread bodies of rubber with the desired cross sectional configuration, and uniting a tread body to the uncovered surface of each of the thin calendered sheets.

8. A method for producing rubber tire treads, which consists in providing a length of lining material, applying to one surface thereof a thin layer of rubber of a certain composition, forming a length of narrower but thicker tread body of rubber of a different composition, and uniting the tread body to the uncovered surface of the thin rubber sheet.

In testimony whereof, we have affixed our signatures hereto.

HENRY A. WALTER.
JESSE R. CROSSAN.